US012784458B1

(12) United States Patent
Zhuge et al.

(10) Patent No.: US 12,784,458 B1
(45) Date of Patent: Nov. 3, 2026

(54) SYSTEMS AND METHODS FOR DRONE-BASED ASSET SURVEILLANCE AND LOCALIZATION

(71) Applicant: HITACHI, Ltd., Tokyo (JP)

(72) Inventors: Huimin Zhuge, Santa Clara, CA (US); Gregory Sin, Sunnyvale, CA (US); Chandrasekar Venkatraman, Saratoga, CA (US); Song Wang, San Carlos, CA (US); Chetan Gupta, Sunnyvale, CA (US)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 19/316,150

(22) Filed: Sep. 2, 2025

(51) Int. Cl.

| | |
|---|---|
| ***G06V 20/52*** | (2022.01) |
| ***G05D 1/244*** | (2024.01) |
| ***G05D 1/644*** | (2024.01) |
| ***G05D 1/646*** | (2024.01) |
| ***G05D 101/15*** | (2024.01) |
| ***G05D 105/85*** | (2024.01) |

(Continued)

(52) U.S. Cl.
CPC ............. *G06V 20/52* (2022.01); *G05D 1/244* (2024.01); *G05D 1/644* (2024.01); *G05D 1/646* (2024.01); *G06V 10/16* (2022.01); *G06V 10/25* (2022.01); *G06V 10/82* (2022.01); *G06V 20/13* (2022.01); *G06V 20/17* (2022.01); *G06V 30/14* (2022.01); *G05D 2101/15* (2024.01); *G05D 2105/85* (2024.01); *G05D 2109/20* (2024.01); *G05D 2111/10* (2024.01)

(58) Field of Classification Search
None
See application file for complete search history.

(56) References Cited

U.S. PATENT DOCUMENTS 10,521,943 B1 * 12/2019 Phillips .................. G06Q 50/16
11,573,564 B2 2/2023 Chen et al.
(Continued)

FOREIGN PATENT DOCUMENTS

CA 3034059 A1 * 2/2018 ............. A01D 46/30
CA 3015779 A1 * 3/2019 ............. A01G 23/00
(Continued)

*Primary Examiner* — Ricky Chin
(74) *Attorney, Agent, or Firm* — PROCOPIO, CORY, HARGREAVES & SAVITCH LLP

(57) ABSTRACT

Systems and methods described herein involve automated aerial surveillance of assets with dynamic flight path optimization and comprise obtaining a satellite image of a monitored area, defining a region of interest (ROI), computing an initial flight path for a drone to capture top-down images, stitching the images to generate a panoramic map, analyzing the map using object detection algorithms to identify areas of interest containing assets within the ROI, generating a refined flight path that prioritizes these areas, processing angled images to identify asset markers using detection algorithms, applying optical character recognition (OCR) to extract text-based identifiers, detecting visual markers, applying localization methods to obtain real-world coordinates, implementing manual search mechanisms when markers are unidentifiable, and outputting asset locations. The system enables precise asset tracking in unstructured environments through adaptive flight optimization and comprehensive identification capabilities.

20 Claims, 7 Drawing Sheets

(51) Int. Cl.

| | |
|---|---|
| ***G05D 109/20*** | (2024.01) |
| ***G05D 111/10*** | (2024.01) |
| ***G06V 10/10*** | (2022.01) |
| ***G06V 10/25*** | (2022.01) |
| ***G06V 10/82*** | (2022.01) |
| ***G06V 20/13*** | (2022.01) |
| ***G06V 20/17*** | (2022.01) |
| ***G06V 30/14*** | (2022.01) |

(56) References Cited

U.S. PATENT DOCUMENTS

| | | | | |
|---|---|---|---|---|
| 2024/0125615 | A1* | 4/2024 | Sameer | B64C 39/024 |
| 2024/0355122 | A1* | 10/2024 | Dryer | G06V 20/50 |
| 2026/0065590 | A1* | 3/2026 | Richwagen | G06T 15/20 |

FOREIGN PATENT DOCUMENTS

| | | | | | |
|---|---|---|---|---|---|
| CA | 2950441 | C | * | 2/2021 | G01N 33/241 |
| CA | 3188675 | A1 | * | 2/2024 | G06V 20/56 |
| CN | 111846222 | A | * | 10/2020 | B64C 39/02 |
| CN | 114359052 | A | * | 4/2022 | G06T 7/13 |
| CN | 114723780 | A | * | 7/2022 | G06T 7/13 |
| CN | 115933718 | B | * | 5/2025 | |
| EP | 3968274 | B1 | * | 3/2025 | G06N 3/0464 |
| EP | 4557034 | A1 | * | 5/2025 | G05D 1/65 |
| KR | 102357290 | B1 | * | 1/2022 | H04N 23/81 |
| WO | WO-2021092451 | A1 | * | 5/2021 | H02J 13/10 |

* cited by examiner

SYSTEMS AND METHODS FOR DRONE-BASED ASSET SURVEILLANCE AND LOCALIZATION

FIELD

The present disclosure is generally directed to aerial surveillance systems, and more specifically to systems and methods for automated asset monitoring and identification using drone-captured imagery and dynamic flight path optimization.

RELATED ART

Aerial surveillance systems have become increasingly valuable for monitoring and managing assets across large-scale environments such as parking lots, logistics hubs, and transportation yards. Traditional methods for asset tracking and management in these environments rely on manual inspection, ground-based surveillance cameras, or fixed RFID scanning systems. These conventional approaches present limitations in flexibility, scalability, and efficiency, particularly in environments where assets are constantly moving or positioned in irregular orientations.

In recent years, unmanned aerial systems (UAS) have emerged as viable solutions for large-scale monitoring due to their ability to rapidly capture aerial imagery and cover expansive areas. Existing drone-based surveillance systems typically employ predetermined flight paths and focus on structured environments where assets are arranged in predictable, organized patterns. For example, container storage facilities and rail yards utilize drone technology for inventory management, where shipping containers are positioned in regular, well-defined locations that can be referenced by specific lot, row, and slot designations.

However, current drone surveillance approaches face several technical limitations. Existing systems rely on fixed flight paths that scan entire areas uniformly, regardless of asset distribution, resulting in inefficient use of flight time and battery resources. These systems typically process individual image frames rather than creating comprehensive panoramic views, making it difficult to obtain coherent, real-time overviews of monitored areas. Additionally, conventional approaches lack adaptive routing capabilities to focus selectively on regions containing assets while avoiding empty areas.

Furthermore, existing drone surveillance systems are designed primarily for structured environments with regularly positioned assets, making them less suitable for unstructured environments where assets may be positioned at arbitrary orientations and locations. Current solutions also lack temporal change detection capabilities, limiting their ability to track incremental changes over time and maintain updated asset inventories.

Accordingly, what is needed are systems and methods that provide adaptive drone surveillance with dynamic flight path optimization and comprehensive asset tracking capabilities for unstructured environments.

SUMMARY

In some aspects of the disclosure, a method for automated aerial surveillance of assets with dynamic flight path optimization comprises: obtaining a satellite image of a monitored area; defining a region of interest (ROI) based on the satellite image; computing an initial flight path for a drone to capture top-down images of the ROI; stitching the top-down images to generate a panoramic map of the ROI; analyzing the panoramic map using object detection algorithms to identify areas of interest containing assets within the ROI; generating a refined flight path that prioritizes the identified areas of interest; in response to the drone following the refined flight path and capturing angled images of assets within the areas of interest, processing the angled images to identify markers associated with the assets using a detection algorithm, wherein the processing comprises applying optical character recognition (OCR) to extract text-based identifiers from the assets and detecting and decoding visual markers on the assets; applying a localization method to image coordinates of the assets to obtain real-world coordinates, thereby enabling precise asset localization in unstructured environments; in response to determining that no markers are identifiable, implementing a search mechanism that enables users to manually select an area within the panoramic map to retrieve corresponding images of that area; and outputting asset locations.

In some aspects, the markers comprise at least one of an identifier, a serial number, a license plate, or a QR code, and the detection algorithm is trained to recognize multiple marker types to accommodate various asset identification systems.

In some aspects, the method further comprises providing a web-based dashboard to enable users to search for assets using the text-based identifiers or by selecting a location on the panoramic map.

In some aspects, the method further comprises performing periodic surveillance flights to capture updated top-down images of the ROI; comparing the updated top-down images with previously stored images using an image processing algorithm to detect changes in asset positions, arrivals, and departures; and optimizing future flight paths based on the detected changes to improve operational efficiency and reduce unnecessary scanning.

In some aspects, optimizing the future flight paths comprises excluding areas with no detected changes from subsequent scans to reduce flight time and conserve drone battery life; and prioritizing areas with significant changes for more frequent updates to maintain accurate and current asset inventory information.

In some aspects, stitching the top-down images comprises applying a deep learning-based feature matching approach to align and merge the top-down images into the panoramic map, wherein the deep learning-based feature matching approach provides superior stitching quality compared to traditional feature-based methods, particularly in environments with varying lighting conditions and complex terrain.

In some aspects, the techniques described herein relate to an apparatus comprising a processor configured to: obtain a satellite image of a monitored area; define an ROI based on the satellite image; compute an initial flight path for the drone to capture top-down images of the ROI; stitch the top-down images to generate a panoramic map of the ROI; analyze the panoramic map using object detection algorithms to identify areas of interest containing assets within the ROI; generate a refined flight path that prioritizes the identified areas of interest; in response to the drone following the refined flight path and capturing angled images of assets within the areas of interest, process the angled images to identify markers associated with the assets using a detection algorithm, wherein the processing comprises applying OCR to extract text-based identifiers from the assets and detecting and decoding visual markers on the assets; apply a localization method to image coordinates of the assets to obtain real-world coordinates, thereby enabling precise asset localization in unstructured environments; in response to determining that no markers are identifiable, implement a search mechanism that enables users to manually select an area within the panoramic map to retrieve corresponding images of that area; and output asset locations.

In some aspects, the techniques described herein relate to a non-transitory computer-readable medium for storing instructions for executing a process comprises: obtaining a satellite image of a monitored area; defining an ROI based on the satellite image; computing an initial flight path for a drone to capture top-down images of the ROI; stitching the top-down images to generate a panoramic map of the ROI; analyzing the panoramic map using object detection algorithms to identify areas of interest containing assets within the ROI; generating a refined flight path that prioritizes the identified areas of interest; in response to the drone following the refined flight path and capturing angled images of assets within the areas of interest, processing the angled images to identify markers associated with the assets using a detection algorithm, wherein the processing comprises applying OCR to extract text-based identifiers from the assets and detecting and decoding visual markers on the assets; applying a localization method to image coordinates of the assets to obtain real-world coordinates, thereby enabling precise asset localization in unstructured environments; in response to determining that no markers are identifiable, implementing a search mechanism that enables users to manually select an area within the panoramic map to retrieve corresponding images of that area; and outputting asset locations.

In some aspects, the localization method comprises a Perspective-n-Point (PnP) algorithm that uses known camera parameters and detected feature points to determine precise GPS coordinates of the assets.

In some aspects, the method further comprises categorizing the assets into different types based on visual characteristics, wherein the different types include at least two of: customer-owned vehicles, leasing company vehicles, and specialized operational vehicles.

Aspects of the present disclosure can involve a system, which can involve means for obtaining a satellite image of a monitored area, means for defining an ROI based on the satellite image, means for computing an initial flight path for a drone to capture top-down images of the ROI, means for stitching the top-down images to generate a panoramic map of the ROI, means for analyzing the panoramic map using object detection algorithms to identify areas of interest containing assets within the ROI, means for generating a refined flight path that prioritizes the identified areas of interest, means for processing angled images to identify markers associated with the assets using a detection algorithm, means for applying a localization method to image coordinates of the assets to obtain real-world coordinates, means for implementing a search mechanism that enables users to manually select an area within the panoramic map to retrieve corresponding images of that area, and means for outputting asset locations.

DETAILED DESCRIPTION

Figure 1:
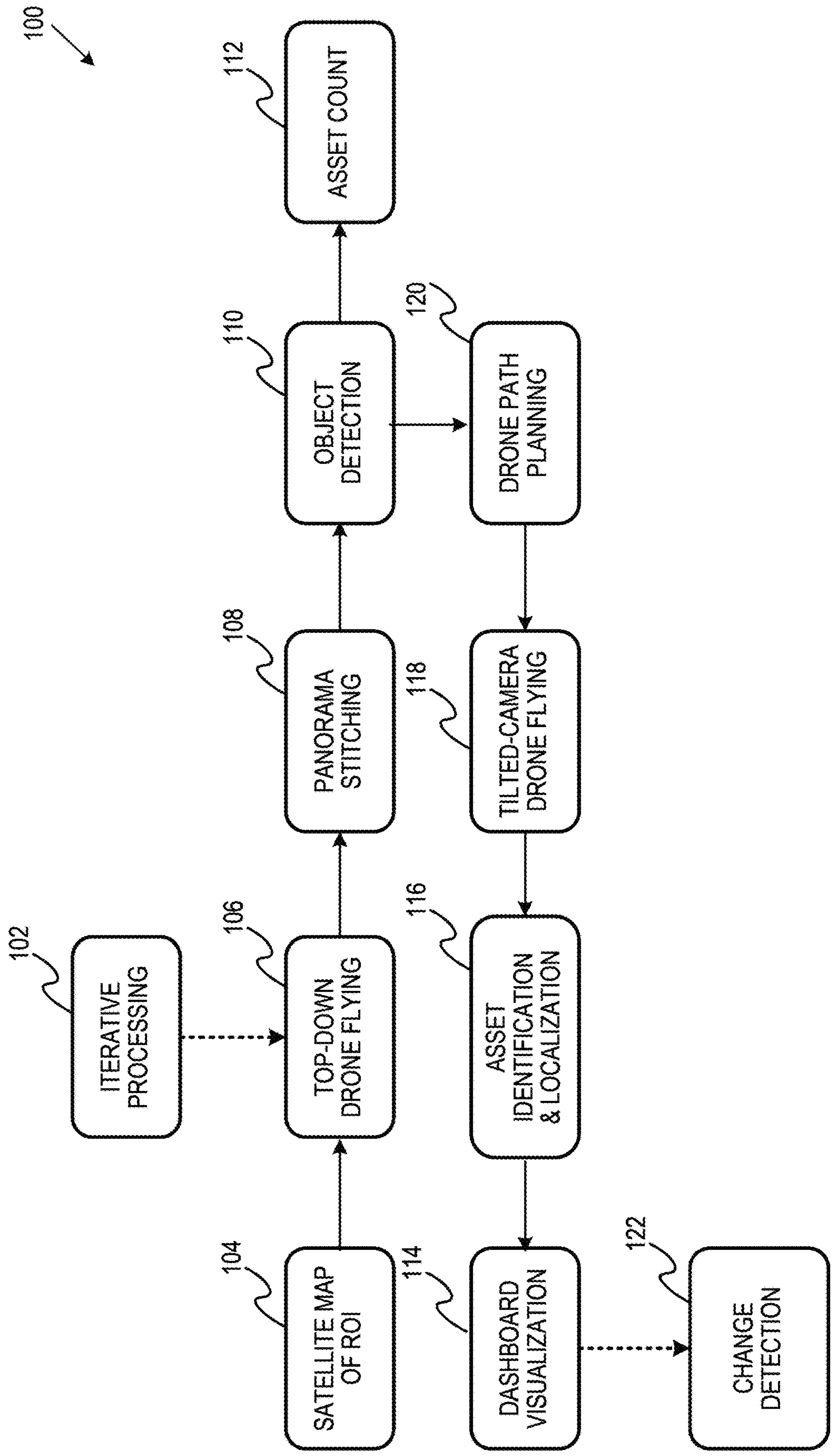
FIG. 1 is a flowchart illustrating an exemplary process for drone-based asset monitoring and surveillance in accordance with various embodiments of the present disclosure.

The following detailed description provides details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application. Selection can be conducted by a user through a user interface or other input means, or can be implemented through a desired algorithm. Example implementations as described herein can be utilized either singularly or in combination and the functionality of the example implementations can be implemented through any means according to the desired implementations.

The limitations of existing drone surveillance systems become particularly pronounced when applied to unstructured asset environments. Unlike container yards where objects are neatly arranged in predictable patterns, truck yards and parking lots present vehicles parked arbitrarily at various orientations, making automated tracking substantially more challenging. Current systems that rely on predetermined flight paths waste considerable time and energy scanning empty areas, as they lack adaptive routing mechanisms to focus on regions containing assets.

Traditional drone surveillance approaches process fragmented image data from separate frames rather than generating stitched panoramic views, resulting in incomplete situational awareness and difficulty in obtaining coherent overviews of monitored areas. This fragmentation limits the ability to perform comprehensive asset counting and spatial analysis across large areas.

Existing systems also lack temporal change detection capabilities, preventing them from identifying incremental changes over time such as asset arrivals, departures, or repositioning. This limitation leads to outdated asset inventories and reduces the effectiveness of tracking asset movements within monitored areas.

The technical challenges extend to asset identification and localization in unstructured environments. Current approaches may struggle with assets positioned at arbitrary orientations, as they lack the flexibility to accommodate various asset placement patterns and identification marker orientations. Additionally, existing systems may not provide alternative search mechanisms when automated identification fails, limiting operational flexibility.

Various embodiments herein provide comprehensive asset surveillance capabilities that accommodate unstructured vehicle placement with arbitrary orientations, implement efficient drone path planning that adapts to asset distribution patterns, generate stitched panoramic views for coherent area monitoring, enable temporal change detection for tracking asset movements over time, provide accurate asset localization using PnP methods for precise GPS coordinate determination, offer multiple search mechanisms including both automated identification and manual location-based retrieval, enhance operational efficiency through real-time automated inventory control with scheduled updates, and deliver scalable solutions applicable to diverse environments including airports, shopping centers, logistics hubs, and urban monitoring applications. The embodiments further enable enhanced security monitoring through detection of suspicious vehicle movements and unauthorized vehicles, while providing historical tracking capabilities that allow for time-based analysis and trend identification to support improved decision-making processes.

FIG. 1 is a flowchart illustrating an exemplary process for drone-based asset monitoring and surveillance in accordance with various embodiments of the present disclosure. System and methods for drone-based asset surveillance may comprise a sequence of operations that enable automated monitoring and tracking of assets across large areas. Process 100 may begin with obtaining a satellite map 104 of a region of interest (ROI), which serves as the reference for establishing the surveillance boundaries and initial flight path configuration of the drone. The satellite image may be sourced from Google Maps or an equivalent mapping service and establishes the monitored area boundaries and initial flight planning parameters. Upon defining the ROI, the system may compute a zigzag flight path to facilitate comprehensive top-down image acquisition of the area. From this satellite image acquisition, process 100 transitions to the first phase of drone operations involving top-down drone flying 106, where the drone adheres to this predefined path, ensuring full coverage while minimizing redundant scanning. Process 100 incorporates iterative processing 102 capabilities, as indicated by the dashed line in FIG. 1, allowing for multiple surveillance cycles and continuous refinement of the monitoring process.

Upon completing the initial scan, the captured top-down images undergo panorama stitching 108 operations to create a unified visual representation of the monitored area. This stitching process combines individual aerial photographs into a seamless panoramic map that provides comprehensive coverage of the surveillance region. For panorama stitching, the system employs either traditional feature-based methods using Scale-Invariant Feature Transform (SIFT) algorithms combined with Random Sample Consensus (RANSAC) techniques for feature matching and geometric transformation estimation, or deep learning-based approaches such as Detector-Free Local Feature Matching with Transformers (LoFTR), depending on the available hardware resources. If computational power is limited, the traditional method is used, whereas LoFTR provides enhanced feature matching capabilities on high-performance hardware. SIFT-based feature detection operates by identifying distinctive key points within overlapping aerial images and generating descriptors that remain invariant to scale, rotation, and illumination changes. The RANSAC algorithm processes the detected feature correspondences to estimate homographic transformations between adjacent images while rejecting outlier matches that may result from repetitive patterns, shadows, or temporary objects within the surveillance area.

Traditional feature-based stitching approaches provide computational efficiency advantages in environments with limited processing resources, enabling real-time panoramic generation on systems with constrained hardware specifications. The SIFT and RANSAC combination delivers reliable stitching performance across diverse environmental conditions, including varying lighting situations, seasonal changes, and weather-related visibility modifications that may affect aerial imagery quality. Alternatively, the system may implement deep learning-based stitching approaches that utilize advanced neural network architectures such as Detector-Free Local Feature Matching with Transformers (LoFTR) for enhanced feature correspondence identification. LoFTR-based processing operates without explicit key point detection stages, instead employing transformer architectures to establish dense feature correspondences across overlapping image regions. Following the panorama generation, the system performs object detection 110 operations to identify and locate assets within the stitched imagery. The object detection phase serves dual purposes within the workflow, feeding information to both asset counting operations and drone path planning algorithms. Asset counting 112 provides quantitative data regarding the number and distribution of detected objects across the monitored area, while the path planning component utilizes detection results to optimize subsequent flight operations.

Process 100 demonstrates parallel processing capabilities where object detection results simultaneously support asset inventory management and flight optimization functions. The drone path planning component receives asset identification and location 116 data and generates optimized flight trajectories for a second phase of aerial operations. This drone path planning 120 phase leads to tilted-camera drone flying 118 operations, which capture high-resolution angled imagery of identified assets to enable detailed identification and marker recognition. Following the creation of the panoramic map, the system refines its approach by focusing on areas of interest. Instead of conducting a repeated full-top-down scan, the drone transitions to an angled flight path, capturing high-resolution images of individual assets. These images undergo processing through object detection algorithms and Optical Character Recognition (OCR) techniques to extract identifying markers such as asset IDs, serial numbers, license plates, or QR codes. The angled flight pattern differs from the initial top-down 106 approach by focusing on specific ROIs rather than providing comprehensive area coverage. The surveillance system provides comprehensive area exclusion capabilities that enable operators to define restricted zones within the monitored environment that require protection from surveillance activities. Restricted area exclusion operates during the initial region of interest configuration phase, allowing operators to manually designate sensitive locations, private property boundaries, or operationally restricted zones that should remain outside surveillance coverage.

Asset identification and localization 116 processes analyze the high-resolution angled imagery to extract identifying markers and determine precise asset positions. For assets possessing identifiable markers, a PnP localization method may be employed to convert 2D image coordinates into real-world GPS coordinates. The extracted data is systematically uploaded onto a web-based dashboard, enabling users to search for assets using identifiers and instantly retrieve their location on the panoramic map, along with detailed close-up imagery. In instances where an asset lacks an identifiable marker, alternative search mechanisms are provided. Users can manually select an area within the panoramic map, prompting the system to retrieve corresponding angled images. This facilitates visual verification and enhances search capabilities, ensuring usability even when OCR processing is unsuccessful. These identification and localization operations feed into dashboard visualization 114 components that present the processed information to system operators, e.g., through web-based interfaces. The dashboard component enables user interaction with the surveillance data, allowing operators to search for specific assets, review imagery, and access location information. The system incorporates temporal monitoring capabilities through change detection 122 operations, which compares current surveillance data with previously captured information to identify asset movements, arrivals, and departures over time. Operators may define restricted areas through interactive mapping interfaces that enable precise boundary specification using polygon drawing tools, coordinate input methods, or geographic information system (GIS) integration capabilities. The restricted area definitions may be stored as persistent configuration data that applies across multiple surveillance cycles, ensuring consistent exclusion of sensitive zones throughout extended monitoring periods.

The surveillance system operates on configurable time intervals that may be adjusted based on operational requirements and monitoring objectives. In some examples, the system may perform surveillance cycles, e.g., every two hours, though this interval may be modified to accommodate different monitoring frequencies ranging from minutes to days depending on the specific application and asset movement patterns. Each surveillance cycle comprises two distinct flight patterns that optimize both coverage and detail capture. The first flight pattern involves a rapid panoramic top-down sweep that provides comprehensive area coverage and establishes the current asset distribution across the monitored region. This initial sweep operates at higher speeds and altitudes to efficiently capture broad area imagery for panoramic stitching and object detection operations. The second flight pattern focuses on detailed angled image capture of areas identified during the panoramic sweep phase. This targeted approach concentrates drone operations on regions containing detected assets, enabling high-resolution imagery capture at angles suitable for marker identification and detailed asset analysis. The dual flight pattern approach maximizes operational efficiency by combining rapid area assessment with focused detailed imaging, reducing overall flight time while maintaining comprehensive surveillance capabilities. To maintain up-to-date surveillance data, the drone performs scheduled monitoring flights, capturing refreshed top-down imagery at designated intervals. A comparative analysis is conducted between newly acquired and previously stored images to detect changes, such as newly arrived or removed assets. If a region remains unchanged, future flight paths are optimized to exclude those areas, conserving operational time and energy. Conversely, regions exhibiting significant changes are prioritized for more frequent updates, enhancing tracking accuracy. The workflow accommodates continuous operation through its iterative design, allowing the system to perform repeated surveillance cycles and maintain current asset inventory information across extended monitoring periods.

Figure 2:
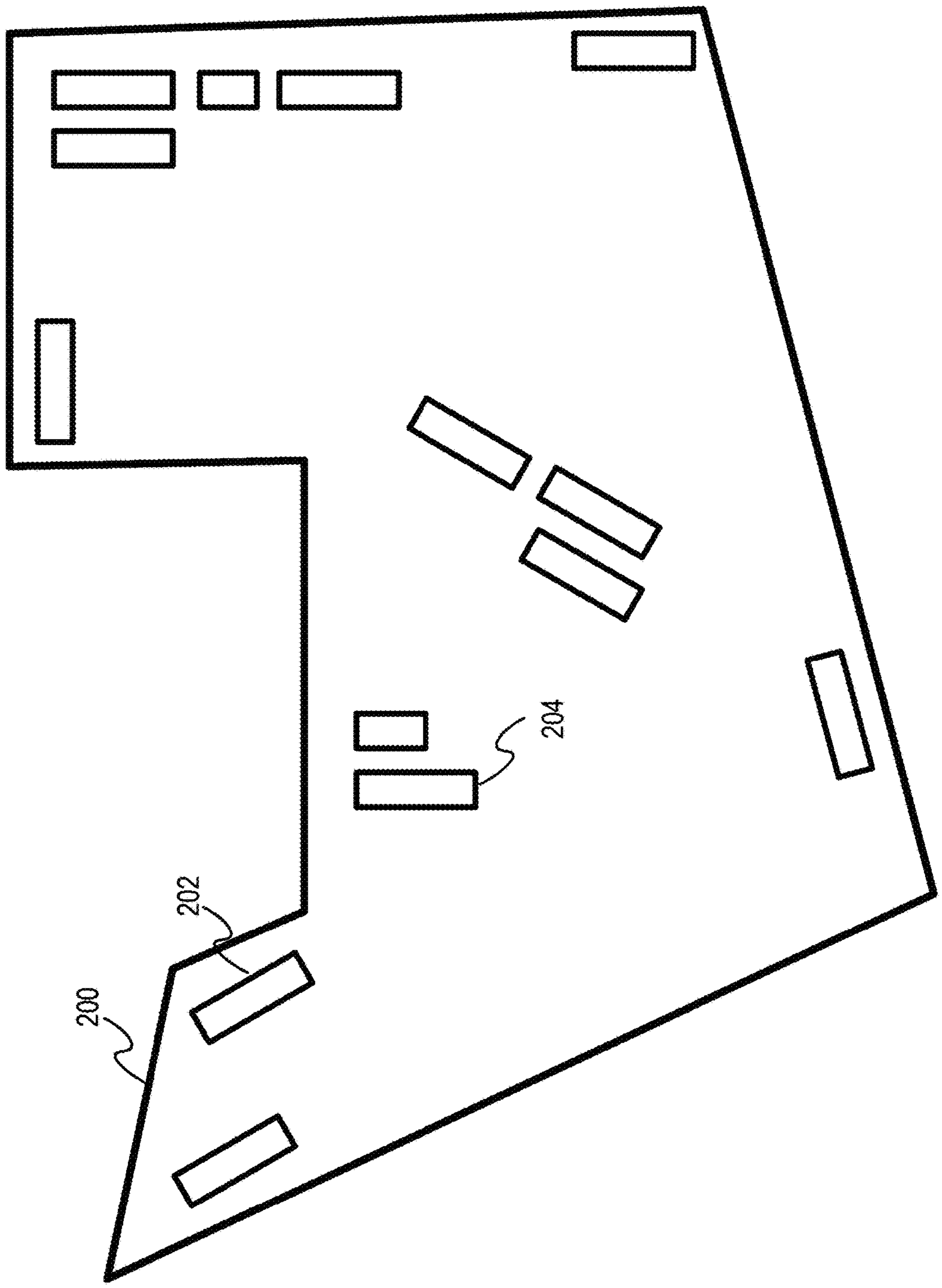
FIG. 2 illustrates an exemplary monitored area with target assets according to various embodiments of the present disclosure.

FIG. 2 illustrates an exemplary monitored area with target assets according to various embodiments of the present disclosure. In FIG. 2, ROI 200 defines monitored area boundaries for an exemplary aerial surveillance operation. ROI 200 has an irregular polygonal boundary that encompasses the surveillance zone where asset monitoring and tracking activities occur. Within ROI 200, rectangular assets (e.g., 202, 204) are distributed throughout the monitored space without predetermined positioning constraints or alignment requirements. As depicted, target assets 202 and 204 are positioned at arbitrary orientations relative to each other and to the boundary perimeter of ROI 200, thus creating an unstructured asset environment.

The unstructured asset placement capability accommodates real-world deployment scenarios where assets may be positioned according to operational needs rather than surveillance optimization requirements. It is understood that target assets within ROI 200 may be oriented at various angles ranging from parallel to perpendicular relative to the boundary edges, with some assets positioned diagonally or at intermediate angles. This arbitrary positioning reflects practical asset deployment patterns found, for example, in parking lots, storage yards, and logistics facilities, where vehicles or equipment are typically placed according to space availability, operational workflow requirements, or user preference rather than systematic arrangement protocols.

Surveillance systems and methods herein accommodate the unstructured asset environment by implementing adaptive detection and tracking algorithms that function independently of asset orientation or positioning pattern. Unlike structured surveillance approaches that rely on predictable asset arrangements and predetermined grid layouts, the methods and systems process arbitrary asset distributions without requiring prior knowledge of asset positioning or orientation constraints. The rectangular assets may be distributed sparsely across some portions of ROI 200, while being concentrated in other areas, creating density variations that the surveillance system addresses through dynamic flight path optimization and adaptive scanning protocols. Stated differently, ROI 200 may encompass areas of varying asset density, with some zones containing clustered rectangular assets while other zones remain relatively empty or contain isolated assets. This heterogeneous distribution pattern requires surveillance approaches that may adjust coverage intensity and scanning frequency based on detected asset concentrations rather than applying uniform surveillance protocols across the entire monitored area. Various embodiments process such unstructured asset environment by analyzing spatial relationships between rectangular assets and identifying areas requiring detailed surveillance attention versus areas that may be scanned more rapidly during surveillance operations.

Figure 3:
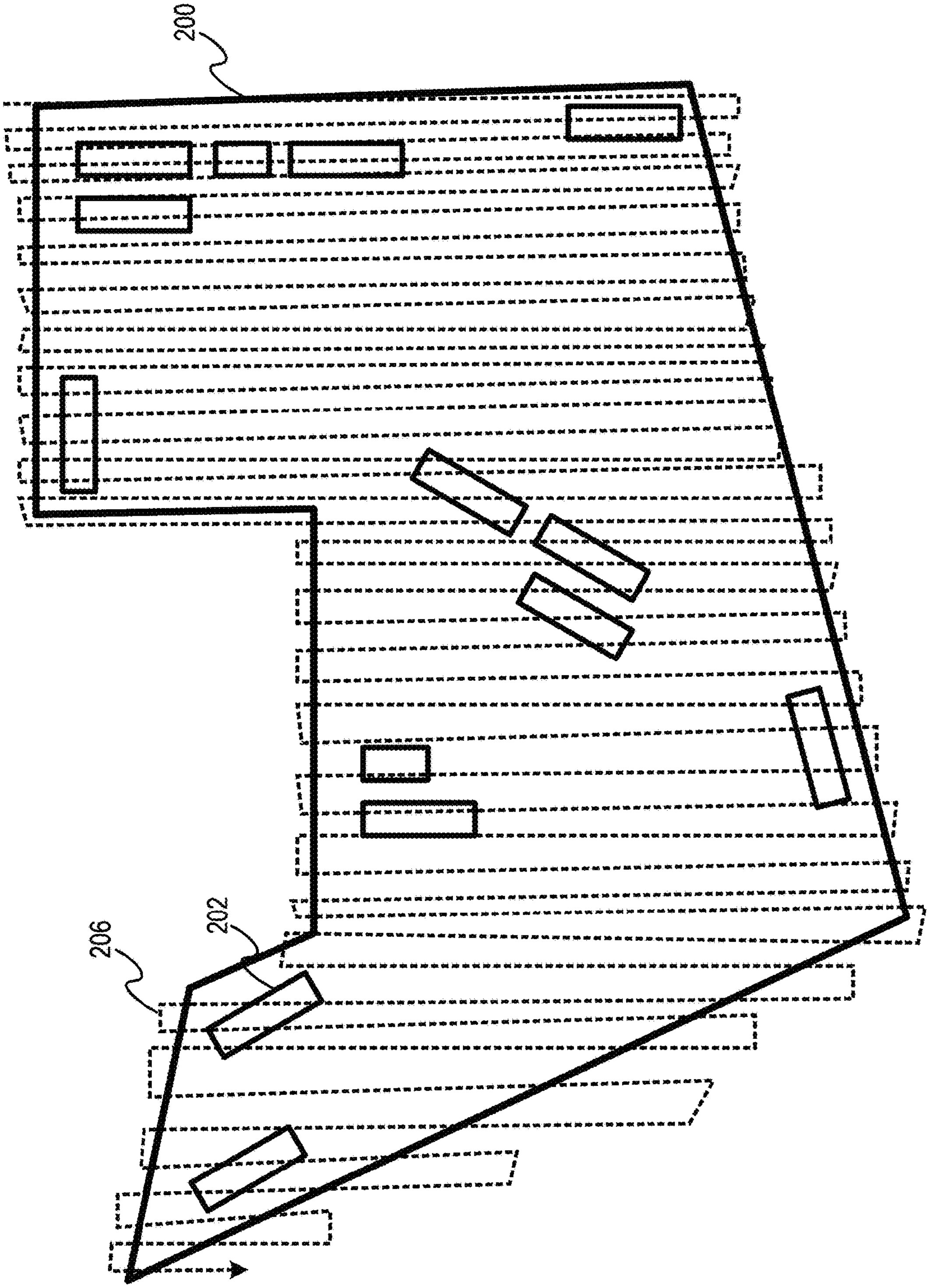
FIG. 3 illustrates an exemplary predefined flight path for the monitored area of FIG. 2 according to various embodiments of the present disclosure.

FIG. 3 illustrates an exemplary predefined flight path for the monitored area of FIG. 2 according to various embodiments of the present disclosure. As depicted in FIG. 3, predefined flight path 206 provides systematic coverage of ROI 200 through parallel vertical scan lines that ensure comprehensive surveillance of the monitored area. Flight path 206 comprises a series of parallel vertical trajectories that traverse ROI 200 from one boundary edge to the opposite boundary edge, creating a systematic scanning pattern that captures aerial imagery across the entire surveillance zone. The parallel vertical scan lines of flight path 206 maintain consistent spacing intervals that enable complete area coverage while minimizing gaps or overlaps between adjacent flight segments. Further, flight path 206 operates independently of asset distribution patterns within ROI 200, providing uniform surveillance coverage regardless of where rectangular assets may be positioned within the monitored space. However, this is not intended as a limitation of the scope of the present disclosure as varying and non-uniform spacing intervals are equally possible.

The systematic scanning approach implemented through flight path 206 enables drones to capture top-down imagery across ROI 200 without requiring prior knowledge of asset locations or distribution patterns. Each vertical scan line within predefined flight path 206 extends across the full width or length of ROI 200, ensuring that no areas within the surveillance zone remain unmonitored, e.g., during an initial scanning phase. The parallel arrangement of scan lines creates overlapping coverage zones that facilitate subsequent image stitching operations and provide redundant imagery for areas where scan lines intersect or overlap. Flight path 206 may be computed algorithmically based on the boundaries of ROI 200, with scan line spacing and trajectory parameters determined to optimize coverage efficiency while maintaining image quality requirements for panoramic stitching operations.

Advantageously, no predefined maps or detailed geographical information about the monitored area beyond the basic boundary definition of ROI 200 is required. The map-independent operation capability allows the system to function in environments where detailed site maps, asset layout diagrams, or infrastructure documentation may not be available or may be outdated relative to current conditions. In embodiments, flight path 206 establishes the foundational surveillance coverage that enables the system to discover and catalog assets within ROI 200 through direct aerial observation rather than relying on predetermined asset location databases or facility management records. This approach provides operational flexibility for deployment in environments where site conditions may change frequently or where comprehensive mapping information may not be accessible.

A drone may follow flight path 206 at predefined altitudes and speeds optimized for capturing high-quality top-down imagery suitable for panoramic stitching and object detection operations. The systematic nature of flight path 206 ensures consistent image overlap ratios between adjacent scan lines, facilitating reliable stitching operations that combine individual aerial photographs into seamless panoramic representations of ROI 200. The parallel vertical scan pattern implemented through flight path 206 may accommodate various region geometries, including irregular boundary shapes, by adjusting scan line lengths and trajectories to conform to the specific contours of ROI 200. In some examples, flight path 206 incorporates turn-around segments at the ends of each scan line that position the drone for efficient transition to the next parallel trajectory while maintaining optimal imaging parameters throughout the scanning sequence.

Flight path 206 in FIG. 3 represents a trajectory sequence that encompasses parallel scan lines and transition segments required to achieve comprehensive coverage of ROI 200 and, in embodiments, may be optimized to minimize total flight time and energy consumption, while ensuring adequate image overlap for successful panoramic stitching operations. The systematic coverage provided by flight path 206 establishes the baseline surveillance data that enables subsequent flight optimization and targeted imaging operations focused on areas containing detected assets. As such, flight path 206 may operate as a scanning protocol that discovers asset locations and distribution patterns within ROI 200, providing the spatial intelligence required for dynamic flight path generation and adaptive surveillance strategies in subsequent monitoring cycles.

Figure 4:
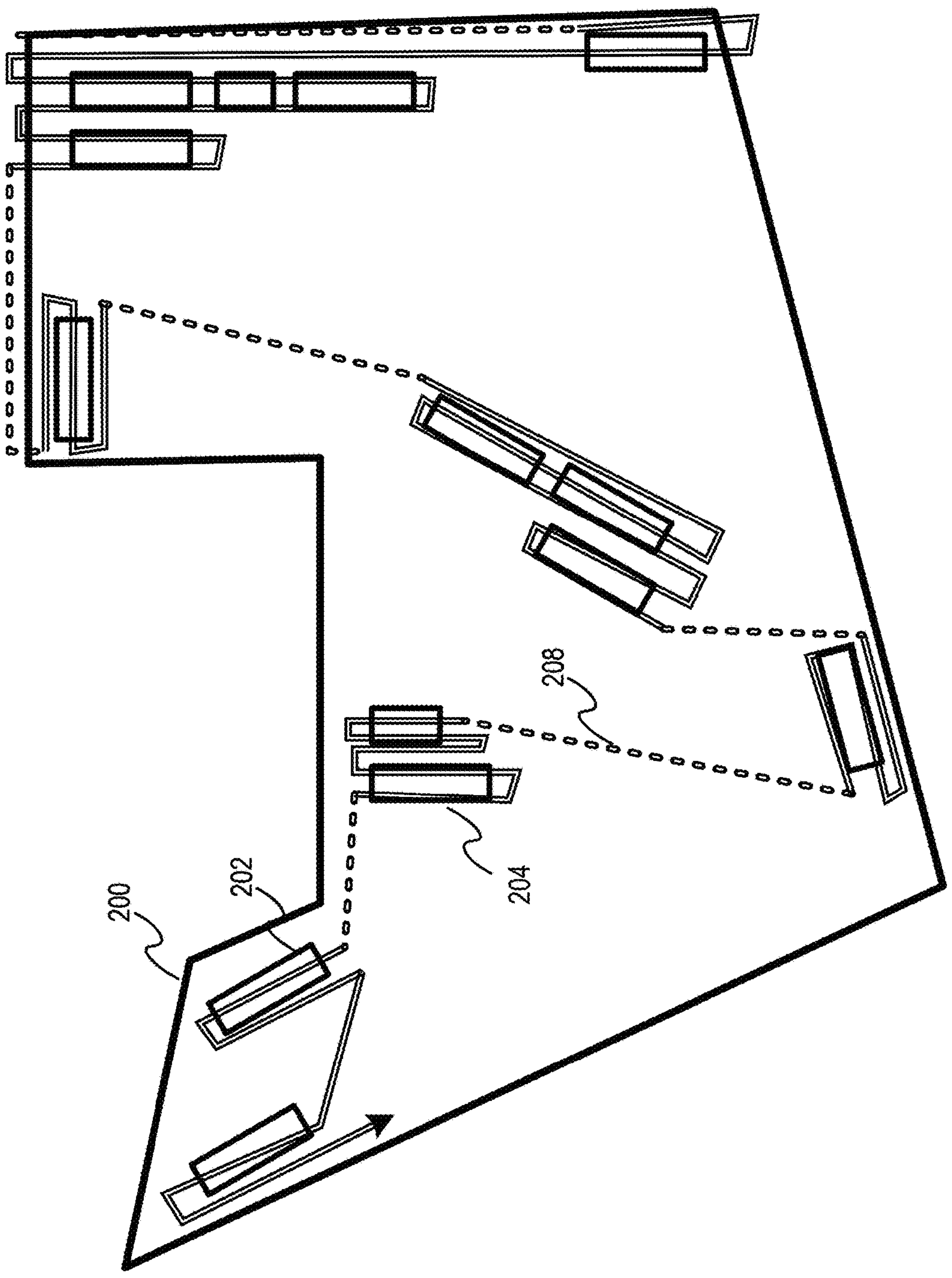
FIG. 4 illustrates an exemplary dynamic flight path for the monitored area of FIG. 2 according to various embodiments of the present disclosure.

FIG. 4 illustrates an exemplary dynamic flight path for the monitored area of FIG. 2 according to various embodiments of the present disclosure. Dynamic path 208 demonstrates adaptive flight trajectory optimization that adjusts drone operations based on detected asset distribution patterns within ROI 200. Dynamic path 208 comprises variable trajectory segments that enable drones to modify both flight direction and operational speed according to the spatial arrangement of assets identified during previous surveillance phases. The adaptive nature of dynamic path 208 allows the surveillance system to concentrate flight operations on areas containing detected assets while reducing time spent traversing empty or sparsely populated regions of the monitored area.

In embodiments, dynamic path 208 incorporates speed modulation capabilities that enable a drone to operate at different velocities depending on the asset density characteristics of specific surveillance zones. In areas where assets are distributed sparsely or are absent entirely, the drone may increase flight speed to traverse these regions more rapidly, thereby reducing overall surveillance cycle duration and conserving battery resources. Conversely, in regions containing concentrated asset clusters or areas requiring detailed imaging operations, the drone may operate at reduced speeds to ensure adequate image capture quality and sufficient overlap for subsequent processing operations. The speed adjustment functionality of dynamic path 208 may be indicated through different line representations, where dotted line segments represent accelerated flight operations and solid line segments indicate normal operational speeds.

A suitable surveillance system may implement orientation-based path adjustment capabilities that enable dynamic path 208 to accommodate assets positioned at various angles within ROI 200. A first rectangular asset 202 and a second rectangular asset 204 demonstrate the arbitrary positioning patterns that the adaptive flight system may encounter during surveillance operations. As depicted in FIG. 4, target assets 202 and 204 are oriented at different angles relative to each other and to the boundaries of the ROI 200, creating orientation diversity that requires flexible imaging approaches to capture identifying markers effectively. The system may analyze bounding box information derived from object detection operations to determine the orientation characteristics of target asset 202 and target asset 204, enabling the flight path optimization algorithms to adjust trajectory angles and imaging positions accordingly.

Dynamic path 208 enables the drone to approach target assets 202 and 204 from optimal angles that facilitate marker identification and detailed imaging operations. The orientation analysis capabilities may determine whether identifying markers such as license plates or asset identification numbers are positioned on the front, rear, or side surfaces of asset 202 and asset 204. Based on these orientation determinations, dynamic path 208 may be adjusted to position the drone at angles that provide clear sight lines to the identified marker locations, improving the probability of successful optical character recognition and marker detection operations.

The adaptive trajectory planning implemented through dynamic path 208 may incorporate real-time decision-making algorithms that evaluate asset distribution patterns and modify flight parameters during surveillance operations. These algorithms may assess the spatial relationships between target assets 202 and 204, and other detected assets to determine optimal flight sequences that minimize total flight time while ensuring comprehensive coverage of all identified targets. Dynamic path 208 may include curved trajectory segments, angular transitions, and variable altitude adjustments that enable the drone to navigate efficiently between asset locations while maintaining appropriate imaging distances and angles for high-quality data capture operations.

As further shown in FIG. 4, speed modulation capabilities of dynamic path 208 provide operational efficiency improvements compared to fixed-speed surveillance approaches. The system may calculate optimal speed profiles for different segments of dynamic path 208 based on factors such as asset density, imaging requirements, and flight transition needs between surveillance targets. Areas containing target assets may require reduced flight speeds to enable detailed marker identification operations, while intervening spaces between asset clusters may accommodate accelerated flight speeds that reduce overall surveillance duration. The variable speed functionality of dynamic path 208 enables the surveillance system to balance comprehensive coverage requirements with operational efficiency objectives, optimizing resource utilization while maintaining surveillance quality standards.

Figure 5:
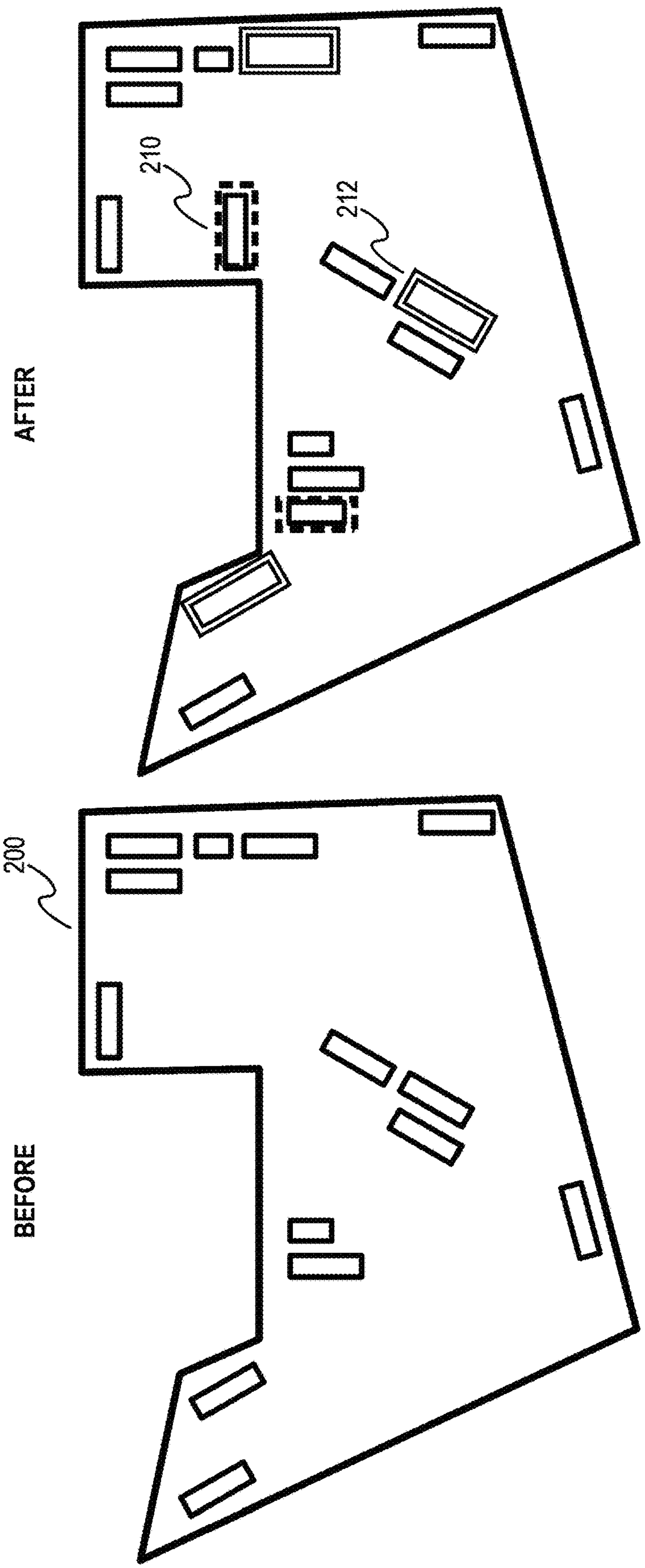
FIG. 5 illustrates an exemplary change detection comparison for the monitored area of FIG. 2 according to various embodiments of the present disclosure.

FIG. 5 illustrates an exemplary change detection comparison for the monitored area of FIG. 2 according to various embodiments of the present disclosure. In embodiments, a surveillance system may implement temporal change detection capabilities that enable monitoring of asset movements, arrivals, and departures across multiple surveillance cycles. For example, change detection functionality may compare current surveillance data with previously captured information to identify modifications in asset distribution patterns within ROI 200. The temporal analysis operates by processing panoramic imagery from successive surveillance cycles and applying image processing algorithms to detect spatial differences between monitoring periods. The system maintains historical surveillance records that serve as baseline references for comparison operations, enabling the identification of both asset additions and asset removals that occur between surveillance intervals.

The change detection process analyzes spatial relationships between assets captured during different time periods to determine whether specific locations within ROI 200 have experienced modifications in asset presence or positioning. An addition (e.g., 210) represents newly detected assets that appear in locations where no assets were previously identified during earlier surveillance cycles. Addition 210 may correspond to vehicles, equipment, or other assets that have entered the monitored area since the previous surveillance operation, indicating increased asset density or new asset deployment within specific zones of ROI 200. The detection of addition 210 triggers updated inventory records and may influence subsequent flight path optimization algorithms to ensure adequate surveillance coverage of newly occupied areas.

Conversely, missing asset (e.g., 212) represents an asset that was detected during previous surveillance cycles but is no longer present in their previously recorded locations during current monitoring operations. Missing asset 212 indicates asset departures, relocations, or removals that have occurred within the monitored timeframe, providing information about asset movement patterns and inventory changes across surveillance periods. The identification of missing asset 212 enables the system to update asset tracking records and may result in modified flight path planning that reduces surveillance intensity in areas where asset density has decreased. The temporal change detection capabilities facilitate comprehensive asset lifecycle tracking by maintaining continuity between surveillance cycles and providing operators with detailed information about asset movement patterns over extended monitoring periods.

Further, the surveillance system may provide asset count information to quantify the total number of detected assets within different areas of ROI 200. Asset counting operations analyze object detection results from panoramic imagery to determine numerical asset distributions across various zones within the monitored area. The counting functionality may segment ROI 200 into discrete areas or grid sections, enabling zone-specific asset quantification that provides detailed inventory information for different portions of the surveillance area. Asset count data may be presented through dashboard interfaces that display numerical summaries alongside spatial visualizations, allowing operators to assess asset density patterns and distribution characteristics across the monitored region.

In embodiments, the system accommodates multiple vehicle type recognition capabilities that enable differentiation between various categories of assets within the monitored environment. The vehicle type identification functionality may distinguish between trucks with identification markings positioned on side surfaces, customer-owned vehicles, leasing company vehicles, and specialized vehicles designated for specific operational purposes such as maintenance, fueling, or cleaning operations. Vehicle type recognition operates through analysis of visual characteristics, marking patterns, and identification features captured during high-resolution angled imaging operations. The classification capabilities enable the system to provide detailed inventory breakdowns that categorize assets according to ownership, operational function, or vehicle specifications.

The multi-vehicle type recognition functionality enhances asset management capabilities by enabling operators to search for and track specific categories of vehicles within the monitored area. Customer trucks may be identified through distinctive marking patterns or identification schemes that differentiate them from fleet-owned or leasing company vehicles. Leasing trucks may display specific identification markers or color schemes that enable automated classification during image processing operations. Specialized vehicles designated for repair operations, fuel delivery, or cleaning services may be recognized through unique visual characteristics, equipment configurations, or identification markings that distinguish them from standard transportation vehicles. The vehicle type classification capabilities provide operational intelligence that supports fleet management, maintenance scheduling, and resource allocation decisions based on detailed asset category information.

The temporal change detection and asset management capabilities operate continuously across multiple surveillance cycles to maintain current inventory information and track asset movement patterns over extended periods. The system may generate change reports that summarize asset additions, removals, and movements detected between surveillance intervals, providing operators with comprehensive updates about monitored area activity. Change detection algorithms may incorporate configurable sensitivity parameters that enable operators to adjust the threshold levels for detecting significant asset movements versus minor positional adjustments that may not require inventory updates. The temporal monitoring capabilities support long-term trend analysis by accumulating change detection data across multiple surveillance cycles, enabling identification of recurring patterns, peak activity periods, and operational trends that may inform strategic planning and resource management decisions.

Figure 6:
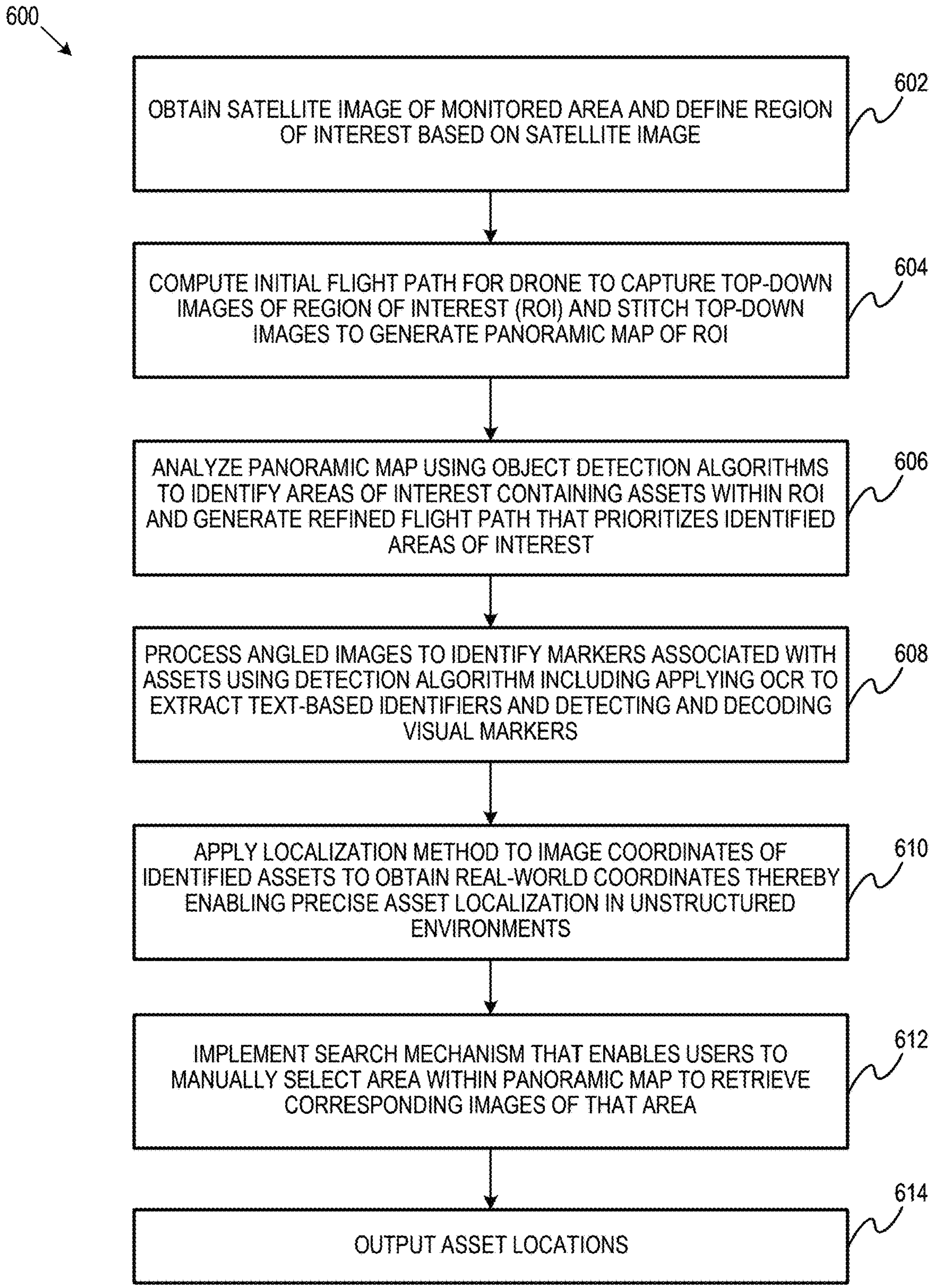
FIG. 6 illustrates an exemplary flowchart for automated aerial surveillance of assets with dynamic flight path optimization in accordance with various embodiments of the present disclosure.

FIG. 6 illustrates an exemplary flowchart for automated aerial surveillance of assets with dynamic flight path optimization in accordance with various embodiments of the present disclosure. Process 600 may start at step 602, where a satellite image of a monitored area is obtained and a region of interest (ROI) is defined based on the satellite image.

At step 604, an initial flight path is computed for a drone to capture top-down images of the ROI, and the top-down images are stitched to generate a panoramic map of the ROI.

At step 606, the panoramic map is analyzed using object detection algorithms to identify areas of interest containing assets within the ROI, and a refined flight path is generated that prioritizes the identified areas of interest.

At step 608, in response to the drone following the refined flight path and capturing angled images of assets within the areas of interest, the angled images are processed to identify markers associated with the assets using a detection algorithm, wherein the processing comprises applying OCR to extract text-based identifiers from the assets and detecting and decoding visual markers on the assets.

At step 610, a localization method is applied to image coordinates of the assets to obtain real-world coordinates, thereby enabling precise asset localization in unstructured environments.

At step 612, in response to determining that no markers are identifiable, a search mechanism is implemented that enables users to manually select an area within the panoramic map to retrieve corresponding images of that area.

Finally, at step 614, asset locations are output.

One skilled in the art shall recognize that: (1) certain steps may optionally be performed; (2) steps may not be limited to the specific order set forth herein; (3) certain steps may be performed in different orders; and (4) certain steps may be done concurrently.

Figure 7:
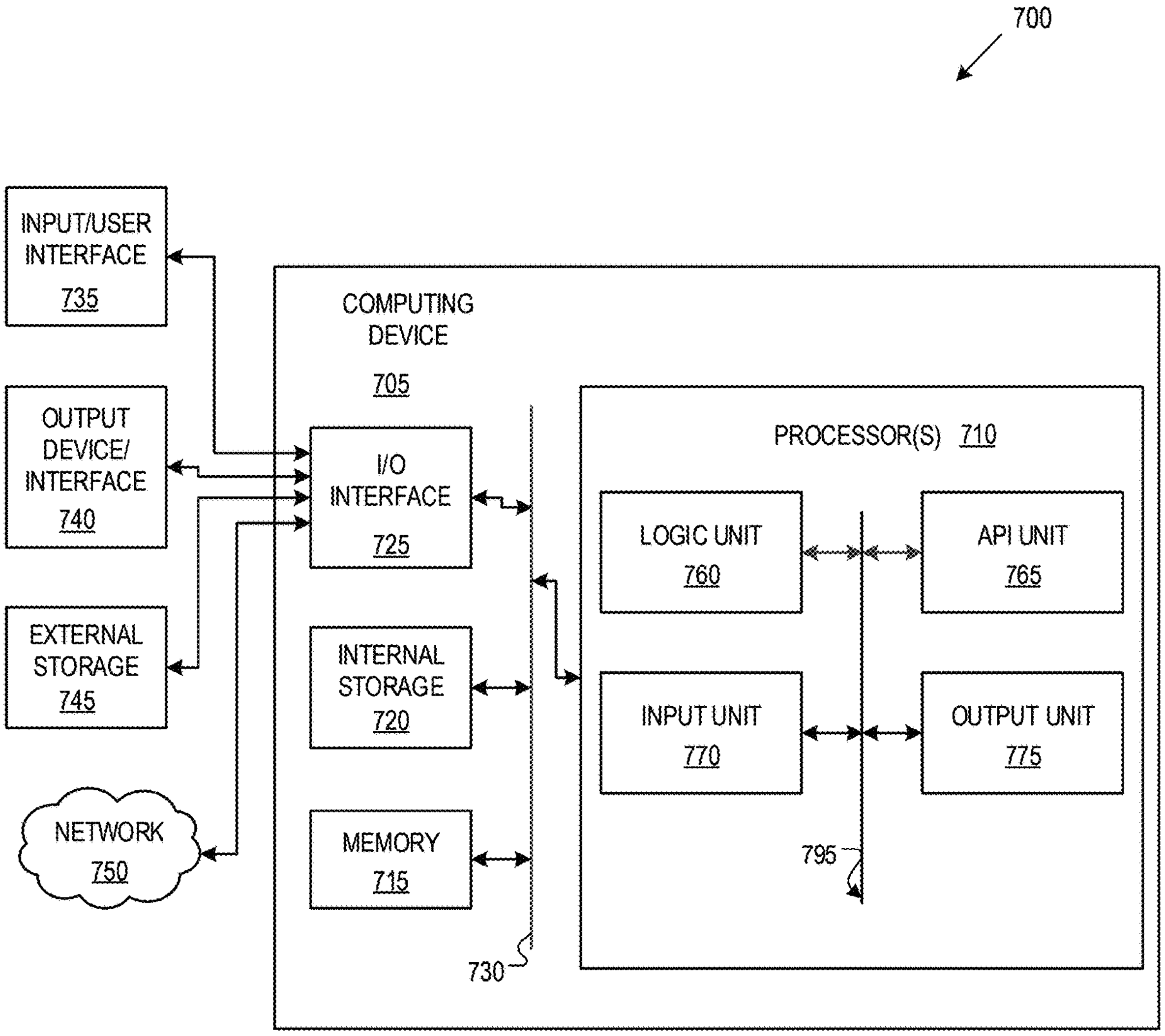
FIG. 7 illustrates an example computing environment according to various embodiments of the present disclosure.

FIG. 7 illustrates an example computing environment with an example computer device suitable for use in some example implementations. Computer device 705 in computing environment 700 can include one or more processing units, cores, or processors 710, memory 715 (e.g., RAM, ROM, and/or the like), internal storage 720 (e.g., magnetic, optical, solid-state storage, and/or organic), and/or I/O interface 725, any of which can be coupled on a communication mechanism or bus 730 for communicating information or embedded in the computer device 705. I/O interface 725 is also configured to receive images from cameras or provide images to projectors or displays, depending on the desired implementation.

Computer device 705 can be communicatively coupled to input/user interface 735 and output device/interface 740. Either one or both of input/user interface 735 and output device/interface 740 can be a wired or wireless interface and can be detachable. Input/user interface 735 may include any device, component, sensor, or interface, physical or virtual, that can be used to provide input (e.g., buttons, touch-screen interface, keyboard, a pointing/cursor control, microphone, camera, braille, motion sensor, optical reader, and/or the like). Output device/interface 740 may include a display, television, monitor, printer, speaker, braille, or the like. In some example implementations, input/user interface 735 and output device/interface 740 can be embedded with or physically coupled to the computer device 705. In other example implementations, other computer devices may function as or provide the functions of input/user interface 735 and output device/interface 740 for a computer device 705.

Examples of computer device 705 may include highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computer device 705 can be communicatively coupled (e.g., via I/O interface 725) to external storage 745 and network 750 for communicating with any number of networked components, devices, and systems, including one or more computer devices of the same or different configurations. Computer device 705 or any connected computer device can be functioning as, providing services of, or referred to as a server, client, thin server, general machine, special-purpose machine, or another label.

I/O interface 725 can include wired and/or wireless interfaces using any communication or I/O protocols or standards (e.g., Ethernet, 802.11x, Universal System Bus, WiMax, modem, a cellular network protocol, and the like) for communicating information to and/or from at least all the connected components, devices, and network in computing environment 700. Network 750 can be any network or combination of networks (e.g., the Internet, local area network, wide area network, a telephonic network, a cellular network, a satellite network, and the like).

Computer device 705 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid-state media (e.g., RAM, ROM, flash memory, solid-state storage), and other non-volatile storage or memory.

Computer device 705 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C#, Java, Visual Basic, Python, Perl, JavaScript, and others).

Processor(s) 710 can execute under any operating system (OS) (not shown), in a native or virtual environment. One or more applications can be deployed that include logic unit 760, application programming interface (API) unit 765, input unit 770, output unit 775, and inter-unit communication mechanism 795 for the different units to communicate with each other, with the OS, and with other applications (not shown). The described units and elements can be varied in design, function, configuration, or implementation and are not limited to the descriptions provided. Processor(s) 710 can be in the form of hardware processors such as central processing units (CPUs) or a combination of hardware and software units.

In some example implementations, when information or an execution instruction is received by API unit 765, it may be communicated to one or more other units (e.g., logic unit 760, input unit 770, output unit 775). In some instances, logic unit 760 may be configured to control the information flow among the units and direct the services provided by API unit 765, input unit 770, and output unit 775, in some example implementations described above. For example, the flow of one or more processes or implementations may be controlled by logic unit 760 alone or in conjunction with API unit 765. The input unit 770 may be configured to obtain input for the calculations described in the example implementations, and the output unit 775 may be configured to provide output based on the calculations described in example implementations.

Processor(s) 710 can be configured to execute a method or computer instructions which can involve, defining an ROI based on a satellite image of a monitored area and computing an initial flight path for a drone to capture top-down images of the ROI; and stitching the top-down images to generate a panoramic map of the ROI and analyzing the panoramic map using object detection algorithms to identify areas of interest containing assets within the ROI, as described, for example, with respect to FIG. 1 and FIG. 3.

Processor(s) 710 can be configured to execute a method or computer instructions which can involve, generating a refined flight path that prioritizes the identified areas of interest; and, in response to the drone following the refined flight path and capturing angled images of assets within the areas of interest, processing the angled images to identify markers associated with the assets using a detection algorithm. The processing may comprise applying OCR to extract text-based identifiers from the assets and detecting and decoding visual markers on the assets, as described, for example, with respect to FIG. 1 and FIG. 4.

Processor(s) 710 can further be configured to execute a method or computer instructions which can involve, applying a localization method to image coordinates of identified assets to obtain real-world coordinates, thereby enabling precise asset localization in unstructured environments; in response to determining that no markers are identifiable, implementing a search mechanism that enables users to manually select an area within the panoramic map to retrieve corresponding images of that area; and outputting asset locations, as described, for example, with respect to FIG. 1 and FIG. 6.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities to achieve a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer-readable medium, such as a computer-readable storage medium or a computer-readable signal medium. A computer-readable storage medium may involve tangible mediums such as optical disks, magnetic disks, read-only memories, random access memories, solid-state devices, drives, or any other types of tangible or non-transitory media suitable for storing electronic information. A computer-readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the techniques of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general-purpose computer, based on instructions stored on a computer-readable medium. If desired, the instructions can be stored on the medium in a compressed and/or encrypted format.

Moreover, other implementations of the present application will be apparent to those skilled in the art from consideration of the specification and practice of the techniques of the present application. Various aspects and/or components of the described example implementations may be used singly or in any combination. It is intended that the specification and example implementations be considered as examples only, with the true scope and spirit of the present application being indicated by the following claims.

What is claimed is:

1. A method for automated aerial surveillance of assets with dynamic flight path optimization, the method comprising:

obtaining a satellite image of a monitored area;

defining a region of interest (ROI) based on the satellite image;

computing an initial flight path for a drone to capture top-down images of the ROI;

stitching the top-down images to generate a panoramic map of the ROI;

analyzing the panoramic map using object detection algorithms to identify areas of interest containing assets within the ROI;

generating a refined flight path that prioritizes the areas of interest;

in response to the drone following the refined flight path and capturing angled images of the assets within the areas of interest, processing the angled images to identify markers associated with the assets using a detection algorithm, wherein the processing comprises:
applying optical character recognition (OCR) to extract text-based identifiers from the assets; and
detecting and decoding visual markers on the assets;
applying a localization method to image coordinates of the assets to obtain real-world coordinates, thereby enabling precise asset localization in unstructured environments;
in response to determining that no markers are identifiable, implementing a search mechanism that enables a user to manually select an area within the panoramic map to retrieve corresponding images of that area; and
outputting asset locations.

2. The method of claim 1, wherein the markers comprise at least one of an identifier, a serial number, a license plate, or a QR code, and wherein the detection algorithm is trained to recognize multiple marker types to accommodate various asset identification systems.

3. The method of claim 1, further comprising providing a web-based dashboard to enable the user to search for the assets using the text-based identifiers or by selecting a location on the panoramic map.

4. The method of claim 1, further comprising:
performing periodic surveillance flights to capture updated top-down images of the ROI;
comparing the updated top-down images with previously stored images using an image processing algorithm to detect changes in asset positions, arrivals, and departures; and
optimizing future flight paths based on detected changes to improve operational efficiency and reduce unnecessary scanning.

5. The method of claim 4, wherein optimizing the future flight paths comprises:
excluding areas with no detected changes from subsequent scans to reduce flight time and conserve drone battery life; and
prioritizing areas with significant changes for more frequent updates to maintain accurate and current asset inventory information.

6. The method of claim 1, wherein stitching the top-down images comprises applying a deep learning-based feature matching approach to align and merge the top-down images into the panoramic map, wherein the deep learning-based feature matching approach provides superior stitching quality compared to traditional feature-based methods, particularly in environments with varying lighting conditions and complex terrain.

7. A system for automated aerial surveillance of assets with dynamic flight path optimization, the system comprising:
a drone configured to capture aerial images; and
a processor, configured to:
obtain a satellite image of a monitored area;
define a region of interest (ROI) based on the satellite image;
compute an initial flight path for the drone to capture top-down images of the ROI;
stitch the top-down images to generate a panoramic map of the ROI;
analyze the panoramic map using object detection algorithms to identify areas of interest containing assets within the ROI;
generate a refined flight path that prioritizes the areas of interest;
in response to the drone following the refined flight path and capturing angled images of the assets within the areas of interest, process the angled images to identify markers associated with the assets using a detection algorithm, wherein the processing comprises:
applying optical character recognition (OCR) to extract text-based identifiers from the assets; and
detecting and decoding visual markers on the assets;
apply a localization method to image coordinates of the assets to obtain real-world coordinates, thereby enabling precise asset localization in unstructured environments;
in response to determining that no markers are identifiable, implement a search mechanism that enables a user to manually select an area within the panoramic map to retrieve corresponding images of that area; and
output asset locations.

8. The system of claim 7, wherein the markers comprise at least one of an identifier, a serial number, a license plate, or a QR code, and wherein the detection algorithm is trained to recognize multiple marker types to accommodate various asset identification systems.

9. The system of claim 7, wherein the processor is further configured to provide a web-based dashboard to enable the user to search for the assets using the text-based identifiers or by selecting a location on the panoramic map.

10. The system of claim 7, wherein the processor is further configured to:
perform periodic surveillance flights to capture updated top-down images of the ROI;
compare the updated top-down images with previously stored images using an image processing algorithm to detect changes in asset positions, arrivals, and departures; and
optimize future flight paths based on detected changes to improve operational efficiency and reduce unnecessary scanning.

11. The system of claim 10, wherein optimizing the future flight paths comprises:
excluding areas with no detected changes from subsequent scans to reduce flight time and conserve drone battery life; and
prioritizing areas with significant changes for more frequent updates to maintain accurate and current asset inventory information.

12. The system of claim 7, wherein stitching the top-down images comprises applying a deep learning-based feature matching approach to align and merge the top-down images into the panoramic map, wherein the deep learning-based feature matching approach provides superior stitching quality compared to traditional feature-based methods, particularly in environments with varying lighting conditions and complex terrain.

13. A non-transitory computer-readable medium storing instructions that, when executed by a processor, cause the processor to perform a method for automated aerial surveillance of assets with dynamic flight path optimization, the method comprising:
obtaining a satellite image of a monitored area;
defining a region of interest (ROI) based on the satellite image;
computing an initial flight path for a drone to capture top-down images of the ROI;
stitching the top-down images to generate a panoramic map of the ROI;

analyzing the panoramic map using object detection algorithms to identify areas of interest containing assets within the ROI;

generating a refined flight path that prioritizes the areas of interest;

in response to the drone following the refined flight path and capturing angled images of the assets within the areas of interest, processing the angled images to identify markers associated with the assets using a detection algorithm, wherein the processing comprises:

applying optical character recognition (OCR) to extract text-based identifiers from the assets; and detecting and decoding visual markers on the assets;

applying a localization method to image coordinates of the assets to obtain real-world coordinates, thereby enabling precise asset localization in unstructured environments;

in response to determining that no markers are identifiable, implementing a search mechanism that enables a user to manually select an area within the panoramic map to retrieve corresponding images of that area; and outputting asset locations.

14. The non-transitory computer-readable medium of claim 13, wherein the markers comprise at least one of an identifier, a serial number, a license plate, or a QR code, and wherein the detection algorithm is trained to recognize multiple marker types to accommodate various asset identification systems.

15. The non-transitory computer-readable medium of claim 13, wherein the method further comprises providing a web-based dashboard to enable the user to search for the assets using the text-based identifiers or by selecting a location on the panoramic map.

16. The non-transitory computer-readable medium of claim 13, wherein the method further comprises:

performing periodic surveillance flights to capture updated top-down images of the ROI;

comparing the updated top-down images with previously stored images using an image processing algorithm to detect changes in asset positions, arrivals, and departures; and optimizing future flight paths based on detected changes to improve operational efficiency and reduce unnecessary scanning.

17. The non-transitory computer-readable medium of claim 16, wherein optimizing the future flight paths comprises:

excluding areas with no detected changes from subsequent scans to reduce flight time and conserve drone battery life; and prioritizing areas with significant changes for more frequent updates to maintain accurate and current asset inventory information.

18. The non-transitory computer-readable medium of claim 13, wherein stitching the top-down images comprises applying a deep learning-based feature matching approach to align and merge the top-down images into the panoramic map, wherein the deep learning-based feature matching approach provides superior stitching quality compared to traditional feature-based methods, particularly in environments with varying lighting conditions and complex terrain.

19. The non-transitory computer-readable medium of claim 13, wherein the localization method comprises a Perspective-n-Point (PnP) algorithm that uses known camera parameters and detected feature points to determine precise GPS coordinates of the assets.

20. The non-transitory computer-readable medium of claim 13, wherein the method further comprises categorizing the assets into different types based on visual characteristics, wherein the different types include at least two of: customer-owned vehicles, leasing company vehicles, and specialized operational vehicles.

* * * * *